Oct. 28, 1941.     R. HAEGELE     2,260,836

EGG OPENER

Filed May 31, 1939

Inventor
Richard Haegele
BY
Attorneys.

Patented Oct. 28, 1941

2,260,836

UNITED STATES PATENT OFFICE 2,260,836

EGG OPENER

Richard Haegele, Villa Park, Ill.

Application May 31, 1939, Serial No. 276,533

7 Claims. (Cl. 65—22)

The invention relates to egg openers and has particularly to do with a novel device for cleanly and sharply cracking and severing the shells of either boiled or raw eggs.

The general object of the invention is to provide a device of the character indicated by means of which the shell of a boiled or raw egg may be severed in a clean-cut circumferential line about the egg without danger of cracking the shell raggedly and irregularly or getting chips of the shell in the egg.

A more specific object is to provide an egg opener embodying a cup dimensioned to receive the end portion of an egg inserted into it with the rim of the cup fashioned in the form of a sharp edge on which the egg rests so that when the bottom of the cup is struck a smart blow the egg shell will be neatly and cleanly severed circumferentially by the sharp edged cup rim.

Another object is to provide a device of the type indicated embodying a standard on which the egg-receiving cup is mounted and housing a hammer mechanism for striking the cup, the standard being so fashioned that upon upending the device the standard itself may be used as an egg cup.

The invention also resides in various structural improvements in the device by virtue of which precision and speed of operation are combined with ruggedness and low cost of manufacture.

Further objects and advantages will be apparent as the following description proceeds taken in connection with the accompanying drawing in which.

Figure 1:
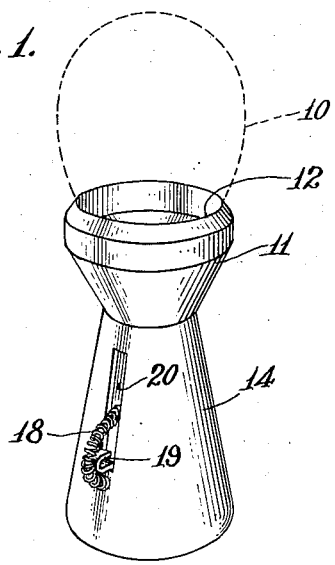
Figure 1 is a perspective view of an egg opener, embodying the invention, an egg being indicated in dot-dash lines in position on it.

For purposes of exemplification and explanation, the invention has been shown herein (Fig. 1) as embodied in an egg opener which may be used either as a household appliance or in restaurants and the like. Despite the fact that this particular embodiment of the invention has been shown and described herein in some detail, there is no intention to thereby limit the invention to such embodiment, but on the other hand the appended claims are intended to cover all modifications and alternative constructions falling within the spirit and scope of the invention.

To receive an egg 10 to be opened, the illustrative device (Fig. 1) is provided with a metal cup 11 dimensioned so that an egg placed in its open end or mouth projects a short distance into the cup with the egg resting on the cup rim. Because of variations in egg size, different eggs will project into the cup for slightly varying distances but the diameter of the cup mouth is such that it is less than the minimum diameter of the smallest egg likely encountered in use.

Figure 2:
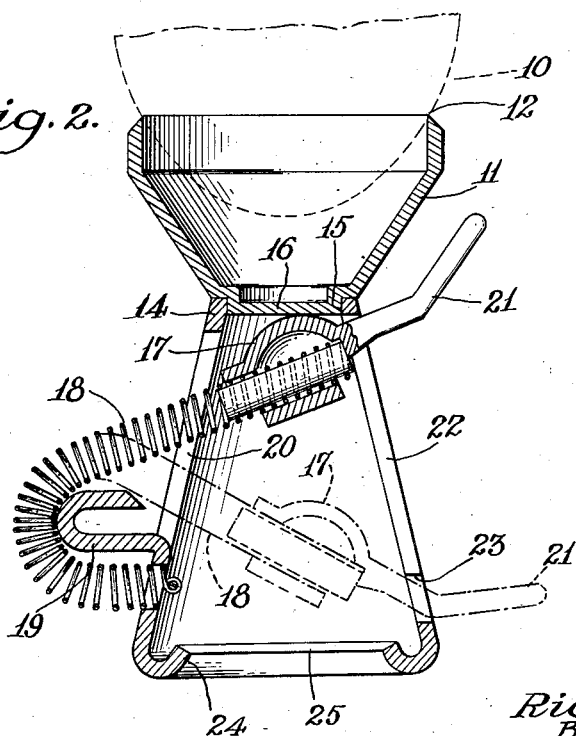
Fig. 2 is an enlarged vertical sectional view of the device.

The key element of the appliance is a sharp edge 12 ground or otherwise formed on the rim of the cup (Fig. 2). The egg rests directly on this sharp edge 12. With the egg so placed its shell may be sharply and cleanly severed, along a circumferential line defined by the edge, by striking a smart blow on the bottom of the cup 11. Apparently the inertia of the egg holds it relatively stationary so that the sharp cup rim 12 is driven through it severing it cleanly but leaving the tough skin or membrane just inside the shell substantially unimpaired. The severed end of the shell is held in place by this membrane so that the contents of the egg does not run down into the cup after the shell has been cracked or severed. After severing the end portion of the shell in the manner described, the egg is removed from the cup and a sharp knife or similar instrument, (not shown), is inserted along the line of the cleavage in the shell to pierce the inner membrane and pry away the severed end of the shell.

In the illustrative appliance, a suitable hammer mechanism for striking the cup is housed within a standard 14 upon which the cup 11 is fast. This standard 14 is fashioned of sheet metal in the form of a truncated cone. The upper edge of the standard defines a central aperture 15 (Fig. 2) in which a cylindrical boss 16 on the bottom of the metal cup 11 is inserted to locate the same during manufacture. The cup 11 is welded or otherwise rigidly fixed in position on top of the standard 14 and its bottom constitutes an anvil member against which the hammer strikes.

The hammer mechanism includes a metal striker or hammer head 17 fixed to the free end of a helical steel spring 18. The other end of the spring is anchored on the side wall of the standard 14 and is held in generally U-shaped configuration by a tongue 19 struck out from the standard. Upon reference to Fig. 2, it will be seen that the spring 18 projects from its anchorage through an aperture 20 in the standard and with its free end flexed so that the hammer head 17 is pressed directly against the bottom of the cup 11. In order to cause the hammer head to strike a blow against the bottom of the cup 11 the operator grips a handle or trigger 21 projecting from the head through a slot 22 in the standard side wall and pulls the same down to the position shown in dotted lines. Then upon release of the trigger 21, the spring 18 snaps upwards so that the head 17 flies up against the bottom of the cup 11 striking it a smart blow.

The amount of tension placed in the spring 18 to throw the hammer head against the cup is determined by the length of the slot 22 so that the force of the blow struck against the cup is regulated within reasonable limits by the dimensions of the apparatus and strength of the spring. This obviates the necessity of any skill or experience on the part of the operator in determining how heavy a blow should be struck against the cup.

In using the appliance the operator grips the hammer handle or trigger 21 and pulls the hammer down to its lowered position in which it is latched by pushing the trigger transversely into a notch 23 at the lower end of the slot 22. An egg 10 is then placed in the cup 11 so that it rests directly on the sharpened cup rim 12. Thereafter the operator flips the trigger 21 sideways out of the notch 23 and the released spring 18 snaps the hammer head 17 up against the bottom of the cup. The striking of the hammer head against the bottom of the cup drives the sharp edge of the cup against the egg shell so that the latter is cleanly severed or cracked in a circumferential line defined by the cup edge. Having so severed the egg shell the user may then remove the egg and pry the severed end of the shell away from the inner membrane which holds it in place, with a knife or other suitable instrument. It will thus be seen that the appliance can be used for opening eggs with extreme rapidity and with perfect assurance of a clean sharp severance of the shell in every instance.

Figure 3:
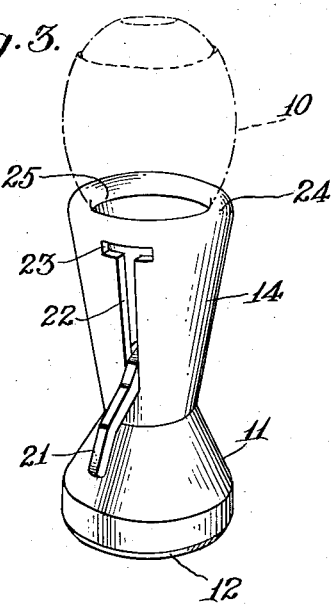
Fig. 3 is a sectional view of the device upended to serve as an egg cup.

Upon inverting the appliance (Fig. 3) it can also be used as an egg cup. For this purpose the lower end of the standard 14 is curled inwardly in the form of a flange 24 with a rounded inner edge defining an aperture 25 dimensioned to receive the egg. When using the appliance as an egg cup it is inverted so that the cup 11 acts as a base with the aperture facing upwardly. The user may then, of course, place the egg in the aperture 25 with the opened end of the egg facing upwardly and scoop out its contents with a spoon in the usual manner. This dual function or use of the device is particularly desirable in case it is used as a household appliance on the breakfast table since it obviates the necessity of providing a separate egg cup.

I claim as my invention:

1. In an appliance of the character described, the combination of a metal cup having an upwardly facing open end adapted to receive the end portion of an egg inserted therein, said open end of the cup being bordered by a sharp circular cutting cup rim positioned for the egg to rest thereon when its end is inserted into the cup, a hammer head located beneath the bottom of said cup, and means including a spring for snapping said hammer head against the bottom of the cup to drive said sharp rim against the shell of an egg resting on it.

2. In an appliance of the character described, the combination of a metal cup having an open end adapted to receive the end portion of an egg inserted therein, said open end of the cup being bordered by a continuous sharp circular rim positioned for the egg to rest thereon when its end is inserted into the cup and with the remainder of the inserted end portion of the egg free of the cup, and hammer means for striking a blow on the bottom of the cup to drive said sharp edge against the shell of an egg resting on it.

3. In a device for opening eggs, a cup-shaped member having a round open end adapted to receive the end of an egg inserted therein and presenting a continuous circular rim bordering such open end with the edge facing generally axially of the round open end and of a diameter less than the maximum diameter of the egg to be opened, said cup-shaped member being shaped to receive an egg with the egg resting on said circular rim and free of the remainder of the inner walls of such member, and said cup-shaped member embodying a bottom wall opposite said open end of sufficient strength to withstand a sharp blow struck thereon to drive said circular rim against the egg shell to crack the same circumferentially.

4. An egg opener comprising, in combination, a hammer head, a fixed anvil member opposed to said hammer head, a flexible spring for impelling said hammer head against said anvil member, means for latching said hammer head in retracted position with said spring flexed, and a ring-shaped member rigid with said anvil member and presenting an upwardly facing sharp circular edge dimensioned to receive the end portion of an egg rested on it.

5. An egg opener comprising, in combination, a hollow housing having a vertically slotted side wall with a notch at the lower end of the slot, an anvil member fast on the top of said housing, a helical spring fixed at one end to said housing and arranged with its free end in the housing and biased by the resilience of the spring toward said anvil member, a hammer head carried by the free end of said spring and urged by it toward said anvil member, a trigger handle on said free end of the spring projecting through the housing slot, said trigger being arranged for engagement with said notch to latch said spring in downwardly flexed position, said spring serving to throw said hammer head upward sharply against said anvil member upon release of the trigger from the notch, and a ring-shaped member rigid with the top of said anvil member and presenting an upwardly facing sharp circular edge dimensioned to receive the end portion of an egg rested on it.

6. An appliance of the character set forth comprising a hollow generally tubular upright standard, a metal cup fast on the top of said standard, the rim of said cup presenting a sharp circular edge on which an egg may be rested for opening it, a hammer mechanism housed within said standard for striking a blow against the bottom of the cup to drive said edge against the shell of an egg rested on it, and the bottom of said standard having an opening in it to receive an egg when the appliance is upended to serve as an egg cup.

7. An egg opener comprising, in combination, a base structure, an upwardly facing cup fixed on the top of said base structure and presenting a continuous circular rim dimensioned to receive the end portion of an egg rested on it, a hammer head disposed within said base structure for movement toward and away from the bottom of the cup, and means including a yieldable spring for impelling said hammer head toward the cup into striking engagement with it.

RICHARD HAEGELE.